(12) United States Patent
Riza et al.

(10) Patent No.: US 8,587,686 B1
(45) Date of Patent: Nov. 19, 2013

(54) HYBRID DIFFERENTIAL OPTICAL SENSING IMAGER

(75) Inventors: Nabeel A. Riza, Oviedo, FL (US); Hassan Foroosh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 327 days.

(21) Appl. No.: 13/049,478

(22) Filed: Mar. 16, 2011

Related U.S. Application Data (60) Provisional application No. 61/314,374, filed on Mar. 16, 2010.

(51) Int. Cl.
*H04N 5/235* (2006.01)
*H04N 5/228* (2006.01)

(52) U.S. Cl.
USPC ...................................... 348/222.1

(58) Field of Classification Search
USPC ........ 348/222.1, 370, 371, 99, 100; 358/480, 358/474, 471; 702/152; 382/154; 356/629, 356/625, 628
See application file for complete search history.

(56) References Cited

U.S. PATENT DOCUMENTS

| | | | |
|---|---|---|---|
| 6,922,233 B2 | 7/2005 | Riza | |
| 7,092,079 B2 | 8/2006 | Riza | |
| 7,590,277 B2 * | 9/2009 | Oaki et al. | 382/141 |
| 8,020,960 B2 * | 9/2011 | Lee | 347/19 |
| 2006/0018530 A1 * | 1/2006 | Oaki et al. | 382/144 |
| 2010/0020122 A1 * | 1/2010 | Lee | 347/19 |

OTHER PUBLICATIONS

E.J. Candes, J. Romberg, and T. Tao, "Robust Uncertainty Principles: Exact Signal Reconstruction from Highly Incomplete Frequency Information," IEEE Trans. Information Theory, vol. 52, No. 2, Jun. 2004.
D. Donoho, "Compressed Sensing," IEEE Trans. Information Theory, vol. 52, No. 4, Apr. 2006.
R.G. Baraniuk, "Compressive Sensing," IEEE Signal Processing Magazine, vol. 24, Jul. 2007.
N.A. Riza and S.A. Reza, "Noncontact Distance Sensor Using Spatial Signal Processing," Optics Letters, vol. 34, No. 4, pp. 434-436, Feb. 2009.
N.A. Riza and S.A. Khan, "Programmable High-Speed Polarization Multiplexed Optical Scanner (P-MOS)," Optics Letters, vol. 28, No. 7, pp. 561-563, Apr. 2003.
S.A. Khan and N.A. Riza, "Demonstration of 3-Dimensional Wide Angle Laser Beam Scanner Using Liquid Crystals," Optics Express, vol. 12, No. 5, pp. 868-882, 2004.

(Continued)

*Primary Examiner* — Nicholas Giles
(74) *Attorney, Agent, or Firm* — Brian S. Steinberger; Phyllis K. Wood; Law Offices of Brian S. Steinberger, P.A.

(57) ABSTRACT

Methods and systems for a differential compressed sensor to form a smart optical imager that uses both active (laser) and passive (ambient light) to sample the direct image information within a three-dimensional spatial frame. The lens-based distance sensor is produces smart sampling of target by adjusting the size of the laser beam spot on the target sampling grid to produce a boundary outline by a light flooding. This target dependent direct sampling of the target results in direct compressed sensing. A passive light acquisition pinhole sampling optical sensor design is proposed that produces the pixel-basis Laplacian to determine the compressed sensed pixels in the incident image.

19 Claims, 5 Drawing Sheets

(56) References Cited

OTHER PUBLICATIONS

S. Sumriddetchkajorn and N.A. Riza, "Micro-Electro-Mechanical System-Based Digitally Controlled Optical Beam Profiler," Applied Optics, vol. 41, No. 18, p. 3506, Jun. 2002.

N.A. Riza and D. Jorgesen, "Minimally Invasive Optical Beam Profiler," Optics Express, vol. 12, No. 9, pp. 1892-1901, Apr. 2004.

M. Gentili and N.A. Riza, "Wide-Aperture No-Moving-Parts Optical Beam Profiler Using Liquid-Crystal Displays," Applied Optics, vol. 46, No. 4, pp. 506-512, Feb. 2007.

M. Sheikh and N.A. Riza, "Demonstration of Pinhole Laser Beam Profiling Using a Digital Micromirror Device," IEEE Photonics Technology Letters, vol. 21, No. 10, May 2009.

D. Takhar, J. Laska, M. Wakin, M. Duarte, D. Baron, S. Sarvotham, K. Kelly, R.G. Baraniuk, "A New Compressive Imaging Camera Architecture Using Optical-Domain Compression," Proc. of SPIE—IS&T Electronic Imaging, SPIE vol. 6065, 606509, 2006.

M. Alnasser and H. Foroosh, "Phase-Shifting for Nonseparable 2-D Haar Wavelets," IEEE Transactions on Image Processing, vol. 17, No. 7, pp. 1061-1068, Jul. 2008.

* cited by examiner

HYBRID DIFFERENTIAL OPTICAL SENSING IMAGER

This application claims the benefit of priority to U.S. Provisional Application No. 61/314,374 filed on Mar. 16, 2010, the entire disclosure of which is incorporated by reference in its' entirety.

FIELD OF THE INVENTION

This invention relates to optical imaging and, in particular, to methods, systems and devices for a hybrid differential optical sensing imager for compressed sensing that uses both active and passive light to intelligently sample the direct image information within a three dimensional spatial frame and four-dimensional with 3-D space plus 1-D time sampling.

BACKGROUND AND PRIOR ART

Compressed sensing is described by E. J. Candès, J. Romberg, and T. Tao, "Robust Uncertainty Principles: Exact Signal Reconstruction from Highly Incomplete Frequency Information," IEEE Trans. Information Theory, Vol. 52, No. 2, February 2006; D. Donoho, "Compressed sensing," IEEE Trans. Info. Theory, Vol. 52, No. 4, April 2006; and R. G. Baraniuk, "Compressive Sensing," IEEE Signal Proc. Mag., Vol. 118, July 2007 builds on the theoretical results developed by Candès, et. al. and Donoho who showed that a signal x of length N having a k-sparse representation of the form $x=\Psi\alpha$ in the basis $\Psi$ can be reconstructed from a small number M of randomly sampled linear projections $\alpha$. Currently, in most existing compressed sensing techniques one does not measure or encode the k significant components of a directly. Rather, M<N (often random) projections=$y(m)=\langle x,\phi(m)\rangle$ of the signal onto a second basis $\phi$ are encoded. In matrix notation, $y=\Phi x$ is measured where y is an M×1 column vector and the measurement basis matrix is M×N. Since M<N, recovery of the signal x from the measurements y is ill-posed. However, compressed sensing theory tells us that for sparse signals, when the basis $\Phi$ cannot sparsely represent the basis $\Psi$, i.e., when the two basis are incoherent, then it is possible to recover the large set of coefficients $\alpha$ and hence the signal x, provided that the number of measurements M is large enough.

There are two main drawbacks in existing compressed sensing methods, often based on random measurement bases. In many practical systems such as computed tomography, SAR, and MRI, random measurement is incompatible with the reconstruction requirements; In random unstructured sampling both computational and memory requirements are almost impossible to meet, defeating the whole purpose of compressed sensing. For instance, for N of the order of $10^6$, measurements of M=25,000 would require more than 3 Gigabytes of memory just to store $\Phi$ and a Gigaflop to apply it. Thus the immediate challenge is whether it is possible to incorporate a priori information in order to choose the sparse set of measurements adaptively.

Recently, several methods have been proposed to find specific bases using training sets. Alternatively, a technique is also proposed to exploit causality of signals in time in order to adapt current measurements based on past ones. These methods either rely on examples or require causality, e.g., video data to achieve adaptive measurements.

Compressed sensing is generally defined as a new method to directly acquire a smaller M (M<<N) sample set signal called the compressed signal without going through the intermediate step of acquiring all N samples of the signal. As described in R. G. Baraniuk, "Compressive Sensing," IEEE Signal Proc. Mag., Vol. 118, July 2007 and Dharmpal Takhar et al., "A New Compressive Imaging Camera Architecture using Optical-Domain Compression," Proc. of SPIE-IS&T Electronic Imaging, SPIE Vol. 6065, 606509, 2006, they used 2-D random codes to directly implement what they say is compressed optical sensing using the DMD SLM single point detector imager design earlier demonstrated by co-inventor N. A. Riza and co-workers.

The R. G. Baraniuk system uses 1600 random measurements taken by the imager to enable compressed sensing to non-adaptively generate the compressed signal. Note that 1600 binary 2-D image masks have to be programmed onto the DMD. In effect, the sensor SLM drive hardware must use a large (e.g., 1600) random mask set, each mask pixel count is the same size as the image to be, recovered for good image reconstruction. This in-turn defeats the purpose of compressed sensing.

To solve the problems associated with the prior art systems, methods and systems of the present invention provide a novel type of compressed sensing camera for optical imaging applications. The sensing optical imager directly acts on the light to deliver the compressed signal without requiring massive data storage or complex computations.

SUMMARY OF THE INVENTION

A primary objective of the invention is to provide methods, apparatus and systems for a differential compressed sensor optical design to form a smart optical imager.

A secondary objective of the invention is to provide methods, apparatus and systems for a compressed sensing optical system that uses both active (laser) and passive (ambient) light to intelligently sample the direct image information within a three dimensional spatial frame with potential to four-dimensional (3-D space plus 1-D time) sampling.

A third objective of the invention is to provide a hybrid active-passive differential optical sensing method to deliver powerful compressed sensed imaging that uses an electronically agile lens-based distance sensor is engaged that can produce smart sampling of target by adjusting the size of the laser beam spot on the target sampling grid to produce a boundary outline by a light flooding method. This target dependent direct sampling of the target results in direct compressed sensing. A passive light acquisition, pin-hole sampling optical sensor design is proposed that produces the pixel-basis Laplacian to determine the compressed sensed pixels in the incident image.

A fourth objective of the present invention is to provide a hybrid imager that provides dual-mode compressed imaging in one system giving redundancy. The imager also provides adaptive compressed sensing and is expected to reduce the need for memory and computational power by orders of magnitude compared to present standard imagers like CCD devices.

A fifth objective of the present invention provides a hybrid imager that provides dual-mode compressed imaging in one system giving redundancy. The imager also provides adaptive compressed sensing and reduces the need for memory and computational power by orders of magnitude compared to prior art standard imagers like CCD devices.

A sixth objective provides a reconstruction algorithm of the present invention is the solution to the following optimization problem:

$$\hat{\alpha}=\mathrm{argmin}\|\alpha\|, s.t. x=\Phi\alpha, \text{and } \nabla\cdot\nabla X|_{\bar{x}=\bar{y}}=0$$

This is a convex optimization problem with the equivalent linear matrix formulation that has a positive definite coefficient matrix, and a homogeneous part that is similar to the classical Helmholtz reduced wave equation. The problem is tractable with computationally efficient solutions.

A first embodiment provides a hybrid imaging system that includes an active image sensor system using a laser beam to produce a target boundary outline by light flooding to collect a sparse data set corresponding to the target boundary outline and a passive image sensor system using direct pin-hole spatial optical sampling of the ambient environment light target image to provide Laplacian for adaptively computing sparse data for dual-mode compressed sensing of the target. The active sensor system includes a laser source to produce the laser beam for illuminating the target, a beam controlling optics to transmit the light beam from the laser source to the target and the reflected optical beam from the target, an optical detector to receive the reflected optical beam and convert the reflected optical beam to a digital data and an active image control processing unit to control the beam controlling optics, components and collect the sparse data set from the optical sensor digital data. The beam controlling optics includes a beam steering optics to direct the laser beam and a digital micromirror device spatial light modulator cascaded with a variable beam forming optics, the digital micromirror device deflecting the laser beam as an on-axis laser beam with the variable beam forming optics to transmit the on-axis laser beam toward the target and retransmit the reflected optical beam from the target. The beam steering optics includes a beam splitter cascaded with a collimating lens for transmitting the laser beam from the laser source to the digital micromirror device and the variable beam forming optics includes an optical lens cascaded with an electronically controlled variable focus lens as a variable three-dimensional beam forming optic to controllably change the beam spot size on the target as a target distance sensor and a scanning mirror having an x-y motion to reflect the on-axis optical beam toward the target for scanning the target with the on-axis optical beam in at least one of the x and y direction to spatially sample the full target in a transverse dimension to determine target profile boundaries in x and y. In this embodiment, the optical detector includes a receive beam steering optics to receive the reflected optical beam to form an object image on a camera that convert the object image to a digital data for the active image control processing unit.

A second embodiment of the present invention provides A hybrid differential optical sensing method that includes the steps of scanning a target with a spatially variable laser sampling beam spot to produce a target boundary outline, adaptively sensing the laser light reflected from the target to form an object image of the target boundary outline, acquiring a sparse data, set from the target boundary outline, using a direct controlled pin-hole optical sampling to acquire a Laplacian from an ambient target environment light, adaptively computing a sparse data set from the Lapacian and producing a compressed sensed image from the sparse data sets. The scanning step includes providing a laser beam from a laser source, using a variable beam forming optics to condition the laser beam on the target, varying a spot size of the laser beam, using light flooding to produce the target boundary outline with the laser beam, and controlling an angular position of a scanning mirror to produce x-y motion on the transverse target field to spatially sample the target in a transverse dimension and further includes repeating the varying and controlling steps to determine target profile and height boundary changes which can scanning the target in an x direction while varying the spot size of the laser beam and scanning the target in a y-direction while varying the spot size to determine asymmetrical target height features.

In this embodiment, the sensing step includes actively sensing the target boundary outline from a reflected laser beam and passively sensing an ambient light from the target environment. The active sensing step can include focusing the reflected laser light on an image recording device and a photodetector, forming a target image on the image recording device, detecting the reflected laser light by a photodetector and producing an output signal in response to detecting the laser light and can include producing a received time modulation by the photodetector from the illuminated target and using laser radar processing for target distance measurements. The passive sensing step includes using a digital micromirror device as a moving pinhole two-dimension image direct optical sampler, focusing the reflected ambient light from the target environment on a photodetector, measuring a current from the photodetector to determine an optical irradiance of a targeted location in an incident object image, shifting a pinhole location on the digital micromirror device by a pixel along each of a x-direction and a y-direction, comparing each next optical irradiance to compute an inter pixel irradiance differential current and the Laplacian, and repeating the focusing, measuring, shifting and comparing steps for each pixel location in an image on the DMD plane.

The comparing step further includes recording the optical irradiance value and pixel location when the current is greater than a predetermined threshold value and discarding the optical irradiance value when the optical irradiance is less than the predetermined threshold value and can include repeating the focusing, measuring, shifting and comparing steps for a 2-pixel inter-pixel distance along the x and y directions, the 3-point differential samples providing a first order approximation of the Laplacian.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The passive sensor mode of the present invention shows that a more efficient way to include prior information is to choose $\Phi$ such that it directly reflects the a priori information being sought. In M. Alnasser and H. Foroosh, "Phase Shifting for Non-Separable 2D Haar Wavelets," IEEE Transactions on Image Processing, vol. 16, pp. 1061-1068, 2008, the co-inventors showed that the Haar wavelet basis can be efficiently phase-shifted to reconstruct missing samples in an image, even under transformations such as rotation, shifting, and shearing. Its extension is the basis of the present invention for differential adaptive compressed measurements and reconstruction in the passive mode.

Let X be the image being sampled. Our passive measurements are given as follows:

$$y = \Phi x, \text{ where } \Phi = \begin{cases} 1 & \text{if } \nabla \cdot \nabla X = 0 \\ 0 & \text{otherwise,} \end{cases}$$

where $\nabla \cdot \nabla X$ is the divergence of the gradient of the 2-D image X, also known as the Laplacian, which is acquired all-optically in our imager. Several important comments are in order. First, the measurement basis $\Phi$ as defined above depends on local image properties and hence is adaptive. More specifically, $\Phi$ directly reflects the prior information that at sampling locations the divergence of the gradient is vanishing. This is crucial information for the reconstruction step as pointed out shortly; second, there is absolutely no need to explicitly implement $\Phi$. Our optical sampler described later directly provides the measurements "y" without explicitly building a huge measurement matrix and performing costly matrix multiplications, thus avoiding memory and computational issues of existing technologies. Third, for typical images at a given scale, $\Phi$ is very sparse and hence very high compression is achievable. As described next, optimal reconstruction is possible from these measurement basis.

The a priori information reflected directly in the measurement basis is essentially encoding the location of the discontinuities. Typical image functions are piecewise continuous, exhibiting only sparse discontinuities. On the other hand, discontinuities are where almost all basis functions $\Psi$ fail to provide accurate reconstruction (e.g., Gibbs phenomenon in Fourier reconstruction). The present invention shows that reconstruction of piecewise smooth functions from these samples is convergent, computationally viable, and the error is bound by the gradient of the function in smooth regions. A multi-scale reconstruction basis is used. Haar wavelets are particularly adequate, since the optical sampler of the present invention essentially provides all the significant. Haar coefficients. Described mathematically, existing compressed sensing methods rely only on observed measurements y to recover x. In the present invention, the optical sampler also provides a subset of $\alpha$. The problem is thus the inverse problem of estimating x given y and a partial knowledge of $\alpha$. The following results hold:

Suppose the scaling function $\phi$ and the wavelets $\psi$ have finite support, $\psi$ has p vanishing moments, x is a piecewise continuous with bounded $p^{th}$ derivatives in each piece of smooth regions, and $x_j$ is its $j^{th}$ level wavelet projection. If the discontinuities in the level $X_{j+1}$ are isolated, then $\|x-x_j\| \leq c\Delta^p \|x^{(p)}\|_{\Omega/D}$, where $\Delta = 2^{-j}$, $\Omega$ is the support space, D is the measurement set, p is the derivative order, c is a finite constant, and all norms could be $l_1$ or $l_2$. This result is very significant because it shows that the error would be small for a proper design of the reconstruction algorithm, since for piecewise smooth functions the magnitude of derivatives in $\Omega/D$ would be negligible.

The reconstruction algorithm of the present invention is the solution to the following optimization problem:

$$\hat{\alpha} = \operatorname{argmin} \|\alpha\|, s.t. x = \Phi \alpha, \text{ and } \nabla \cdot \nabla X|_{x=y} = 0$$

This is a convex optimization problem with the equivalent linear matrix formulation that has a positive definite coefficient matrix, and a homogeneous part that is similar to the classical Helmholtz reduced wave equation. The problem is tractable with computationally efficient solutions.

There are numerous applications where imaging of objects is desirable. These vary from, aerospace, astronomy, medical, industrial, and space applications. Typically, imaging is done by CCD and CMOS cameras that are made as 2-D detector arrays or pixels in a camera. Typically; a camera can have 1 million pixels that, generate 1 million gray-scale levels that make an image. Tremendous image data is generated that can be a burden in many applications. Thus the search is on to find an imager that implements direct compressed sensing so only the useful image data is captured.

The present invention provides a hybrid active-passive Differential Optical Sensing (DOS) method to deliver powerful compressed sensed imaging. The mathematical foundation of the proposed compressed sensing method is embedded in the optical image's spatially differential data set present in the x, y, and z Cartesian coordinate frame of the sensed object. The sensor of the present invention optically acquires the differential data set by uniquely using both an illumination laser and the ambient target environment light, thus providing a redundancy in the image acquisition and signal processing chain.

The direct sensing, method is adaptive as it deploys both a spatially variable laser sampling beam spot to produce a target boundary outline by a light flooding method for sparse data set acquisition and a direct controlled pin-hole sampling optical method to provide the Laplacian to adaptively compute sparse data. These combined hybrid active-passive sensor features provide a powerful and novel method to implement compressed sensing for the imaging application. The hybrid imager of the present invention provides dual-mode compressed imaging in one system giving redundancy. The imager also provides adaptive compressed sensing and is expected to reduce the need for memory and computational power by orders of magnitude compared to present standard imagers like CCD devices.

One skilled in the art should realize that the particularities in the optical sensor system should not be construed as limitation of the preferred embodiment. Various system configurations and corresponding components may be chosen and optimized for a particular application to achieve a desired performance and other methods to determine target axial position/distance, such as time of flight or laser radar methods can be substituted.

Figure 1:
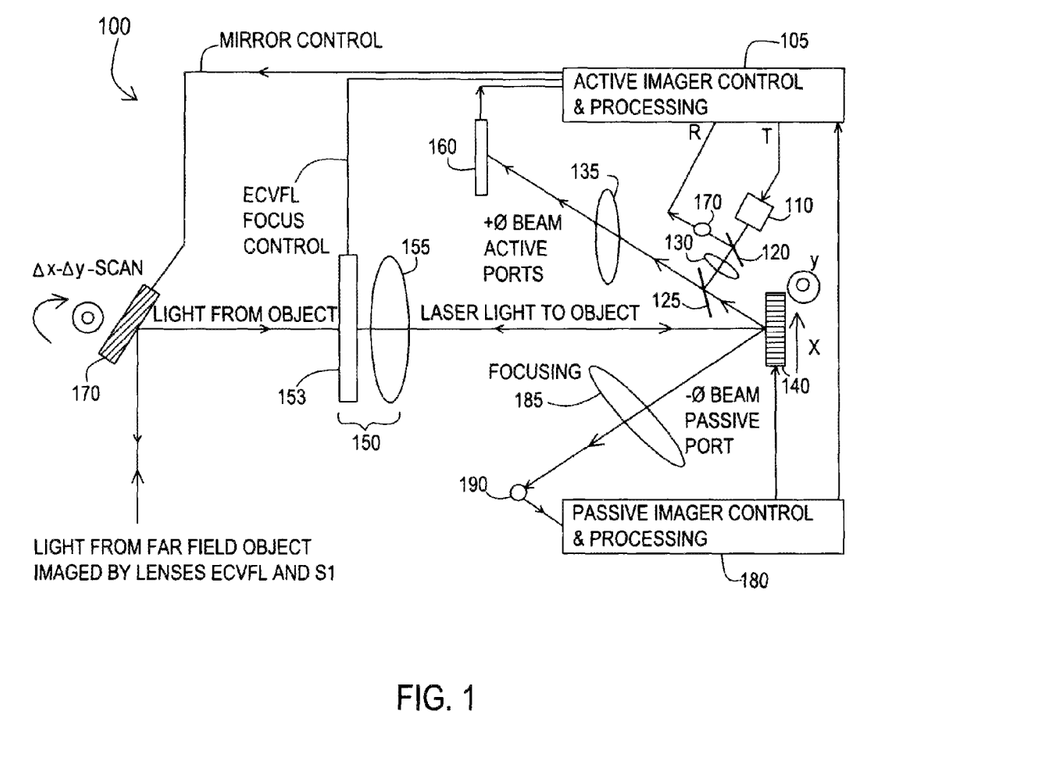
FIG. 1 is a schematic diagram of a preferred embodiment of the hybrid differential optical sensing system to deliver compressed sensing.

FIG. 1 is a schematic diagram showing a basic design of the preferred embodiment of the compressed sensing optical system that can meet extreme imaging application challenges. The goal is to acquire only the relevant target information in the observed image scene and thus achieve compressed sensing that is target, information rich and data transfer efficient. The method and system of the present invention includes two types of sensors inherently built into the design. One sensor is an active image sensor using a laser beam as its target illumination source. The other sensor relies on direct controlled spatial optical sampling of the ambient environment light target image. Both sensors are used together to deliver the full power of compressed sensing of the target.

As shown in FIG. 1, a laser beam from laser 110 passes through a beam splitter 120 and collimating/focusing lens 130 to deflect off beam splitter 125 directed toward the digital micromirror device (DMD) spatial light modulator (SLM) 140. The DMD 140 is set to its +θ state and hence the light coming from the laser 110 is deflected by a 2θ angle to become on-axis with the imaging lens system 150 made of two lens modules that includes lens 155 and Electronically Controlled Variable Focus Lens (ECVFL) 153. The combined lens system 150 is used as a variable 3-D beamforming optic to condition the laser beam spot on the target 200. Specifically, the transverse size of the laser spot on the target is controlled, and in fact forms, a target distance sensor as described in N. A. Riza and S. A. Reza, "Non-Contact Distance Sensor using Spatial Signal Processing," Optics Letters, Vol. 34, No. 4, pp. 434-436, Feb. 15, 2009 which is the work of the inventor of the subject patent application.

In other words, by simply sweeping the calibrated ECVFL focal length to change the spot size to observe a minimal spot size via CCD 160, the target distance can be computed. The laser light returning from the target passes through the same variable beam forming optics (mirror 1170, ECVFL 153 and lens 155) to be deflected by the DMD 140 (+θ state) to pass through another beam splitter 125 towards another imaging lens 135 to form the object image on a moderate resolution CCD chip 160. The deflected laser light from beamsplitter 120 is focused by lens 130 to fall on a high speed photo-detector 170. An active imager control and processing unit 105 controls the laser source, the beam controlling optics components 150, 170 and receives the output signals from the photo detector 170 and CCD 160 to collect the sparse data set. For imaging system active sensing operations, the laser 110 is electrically turned-on for transmit (T) mode to produce the required level of light energy in a given pulse time. Hence, the photo detector 170 produces the received (R) time modulation from an illuminated target, and as a result, standard laser radar processing can be deployed for distance measurement.

Figure 2A:
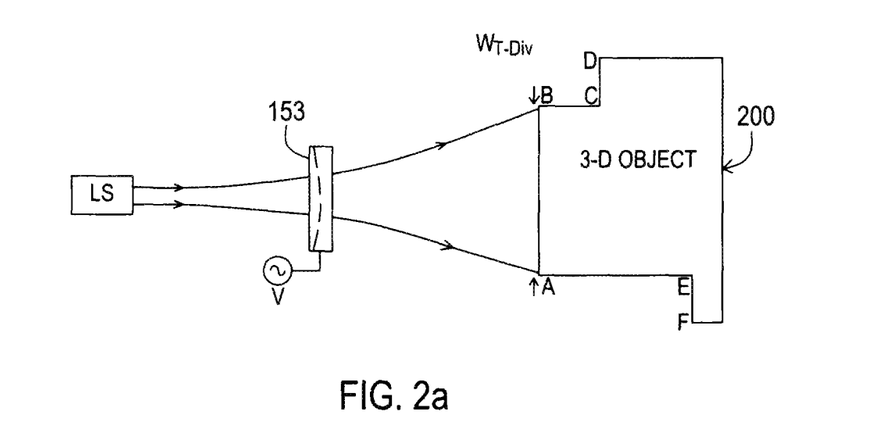
FIG. 2a is a top view of a principles of the active compressed sensor where the transverse direction object spatial sampling is implemented by a scanning laser beam using the smart data compressed large beam spot size scanning.
Figure 2B:
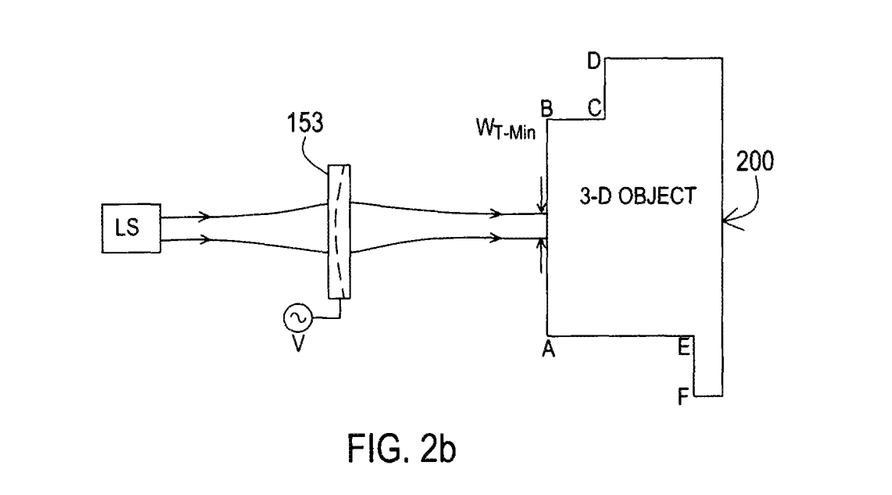
FIG. 2b is a top view of a principles of the active compressed sensor where high spatial resolution target feature sampling using the ECVFL in its converging lens mode with laser spot smaller than target feature size.

The transmitted laser beam angular position to produce x-y motion on the transverse target field is controlled by the scanning mirror 170. For example, an mirror angular step of $\theta_x$ and $\theta_y$ produce far-field laser beam spot motions of $\Delta x$ and $\Delta y$, respectively. The scanning operation of the mirror 170 is used to spatially sample the full target in the transverse dimensions. The mirror 170 scan step size is intelligently controlled by viewing the received image spot size on the CCD 160 and adjusting the ECVFL focal length to produce larger spot sizes on the target until a target boundary becomes visible. FIG. 2a shows a top view of s principle of the active compressed sensor where the transverse direction object spatial sampling is implemented by a scanning laser beam using the smart data compressed large beam spot size scanning using the ECVFL in its diverging lens (concave state) mode with spot size matched to target feature size AB. FIG. 2b is a top view of a principles of the active compressed sensor where high spatial resolution target feature sampling using the ECVFL in its converging lens (convex state) mode with laser spot smaller than target feature size.

Figure 3:
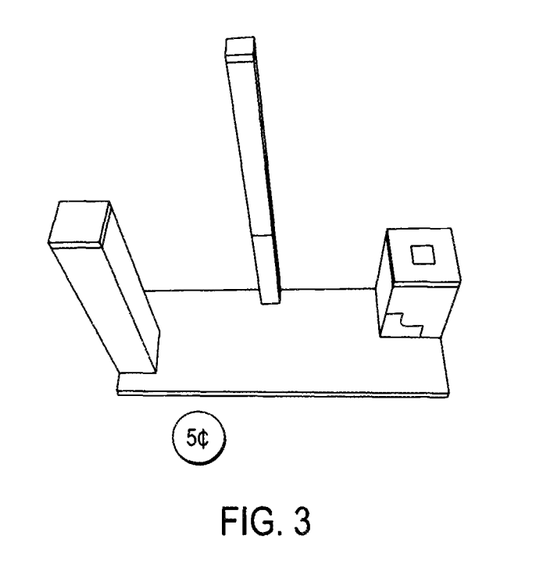
FIG. 3 is a side view photograph showing a mini-skyscraper experimental test structures test object and a U.S. currency nickel (5 cents) coin for scale comparison.

Note that a target boundary in the transverse dimension of a target is marked by a near step-wise change in the target height profile, i.e., along the laser beam optic axis or z-direction. Thus a differential change of target profile in the z-direction or $\Delta z$ is a direct physical (i.e., Electro-Magnetic (EM) Wave-Material interaction property) indication of a compressed-pixel boundary on the target x-y plane. Recently the co-inventor, N. A. Riza has experimentally demonstrated the basics of the active sensor according to the present invention for 3-D object shape reconstruction using the beam flooding method. As an example, FIG. 3 shows a sample mini-sky scraper 3-D test object that is illuminated by the ECVFL agile lens scanning laser beam sensor.

Figure 4A:
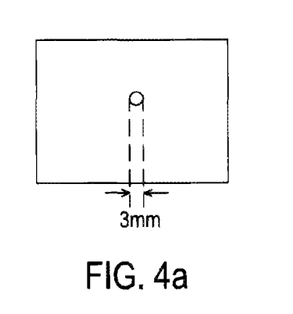
FIG. 4a shows the light flooding method for target boundary detection using a flooding beam that increases in spot size using the focus/defocus control of the ECVFL.
Figure 4B:
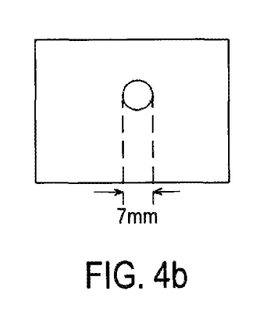
FIG. 4b shows the light flooding method for target boundary detection using a flooding beam that increases in spot size using the focus/defocus control of the ECVFL.
Figure 4C:
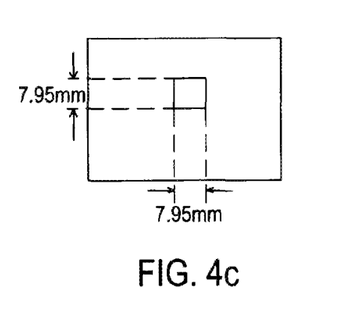
FIG. 4c shows a square boundary that stays in focus while the background goes out of focus in the image plane.

Specifically; by illuminating the target at a given $z=z_1$ reference plane with a variable spot/pixel size and increasing this spot/pixel size till a physical boundary becomes observable on the viewing. CCD chip, a method for direct compressed sensing becomes a reality. FIG. 4a shows the light flooding method for target boundary detection using a flooding beam that increases in spot size using the focus/defocus control of the ECVFL; FIG. 4b shows the light flooding method using a flooding beam that increases in spot size using the focus/defocus control of the ECVFL. Mini-sky-scraper structures are shown that feature experimental extraction of Surface 'A' (highest and smallest surface in FIG. 3) using the flooding method implemented by agile lensing-based beam expansion as beam spot size increases from FIG. 4a to FIG. 4c; and FIG. 4c shows a square boundary that stays in focus while the background goes out of focus in the image plane.

Hence, target compressed pixel sizes $\Delta x$ and $\Delta y$ become known and the next scan mirror step sizes $\Delta x$ and $\Delta y$ are determined. In effect, the system does not sample the target over the entire target zone with a small fixed spot size beam but samples only in the largest steps of $\Delta x$ and $\Delta y$ that determine target profile/height boundary changes. The edge-like feature in naturally produced or man-made 3-D targets enhances the optical boundary viewing and the proposed active sensor takes full advantage of this naturally occurring physics-based phenomenon, somewhat like the over-shoot signal of the Gibbs phenomena in filter reconstruction by capture of spatial frequencies. It is also important to note that if target height features are asymmetrical, $\Delta x$ and $\Delta y$ do not follow together and the target must be scanned independently in x and y directions to determine target profile boundaries in x and y. Another useful point to note is that for most military applications, it is the target boundary locations that become the key in image post-processing for target identification such as determining the type of missile or aircraft.

Referring back to FIG. 1, the sensing system 100 also acts as a passive sensor when the laser 110 is turned off. In this case, using the ambient light in the target environment, the ECVFL-S1 150 optical system is set to view the target at a determined $z=z_1$ plane. The DMD 140 is used as a moving pinhole 2-D image direct optical sampler when a selected location on the DMD 140 is set to the −θ micro-mirror state and all other spatial location micromirrors are set to the +θ state (e.g., θ=12°). Hence, light from the chosen pixel on the target image is directed along 2θ deflection angle to the collection/focus lens 185 to fall on a high speed photo-detector 190. In effect, the optical irradiance of a targeted pixel/location in the incident object image is measured by the photo detector 190 current i(t). Next, the pinhole location on the DMD 140 is shifted by one pixel along the x-direction and the pixel irradiance is measured and electronically compared to the previous pixel irradiance, thus computing an inter-pixel irradiance differential current $i_\delta(t)$ and the Laplacian, e.g., via use of simple electronics (e.g., 1×2 electronic switch, sample-and-hold circuit and a high speed differential amplifier and thresholding circuit).

If $i_\delta(t)$ is larger than an allocated threshold value, the location and irradiance of these pixels on the DMD are recorded, otherwise the pixel irradiance information is discarded leading to compressed imaging. This process of single pixel x-shift differential current generation and thresholding is repeated for all pixel locations in the image on the DMD plane. A similar operation is conducted with a single pixel shift along the y-direction. In addition, differential current generation is conducted for a 2-pixel inter-pixel distance along the x and y directions for the entire image. Overall, these 3-point differential samples provide a first order approximation of the Laplacian as needed by the passive mode of our compressed imager.

However, the optical sampler is capable of providing more general n-point differential samples (n>3) for better estimating the Laplacian. Via the Laplacian differential current measures and its thresholding operations, a compressed data set of pixels for the incident image are generated by the passive sensor shown in FIG. 1. In this way of passive sensing, the compressed sensed image at the $z=z_1$ range is acquired.

Figure 5A:
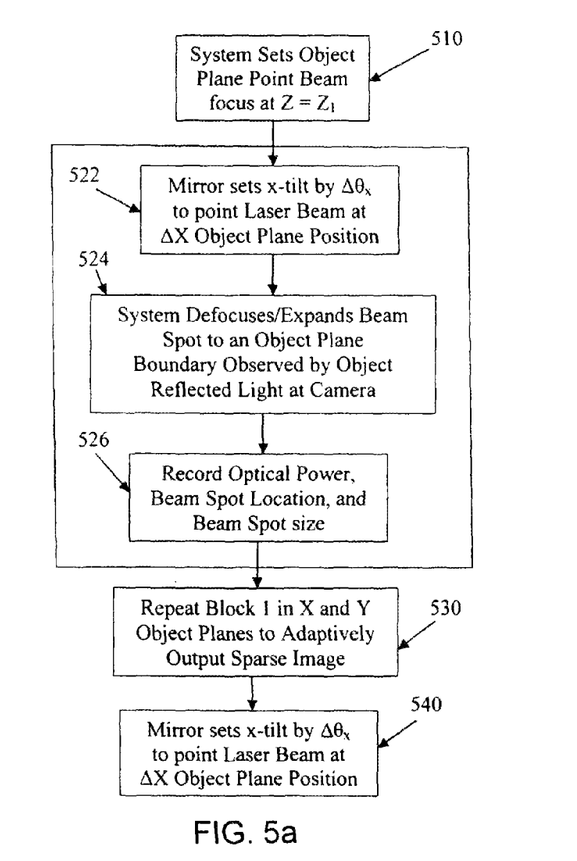
FIG. 5a is a flow chart showing the signal processing chains for the active sensors.

In addition, time, domain processing via the laser system can also be incorporated into the compressed sensing process. Flow charts FIGS. 5a and 5b indicate the signal processing chains for the active and passive sensors, respectively. FIG. 5a is a flow diagram showing the signal processing steps for the active sensors. The object plane point beam focus at $Z=Z_1$ is set in step 510. In step 522 the mirror x-tilt is set by $\Delta\theta_x$ to point the laser beam at $\Delta X$ object plane position, then the system defocuses, or expands the beam spot to an object plane boundary observed by the object reflected light at the camera in step 524 (see FIGS. 4a, 4b and 4c), then the optical power, beam spot location and beam spot size are recorded in step 526. Steps 522, 524 and 526 are repeated for each of the X and Y object planes to adaptively output a sparse image in step 530. The actively compressed sensed image at $Z=Z_1$ is produced in step 540.

Figure 5B:
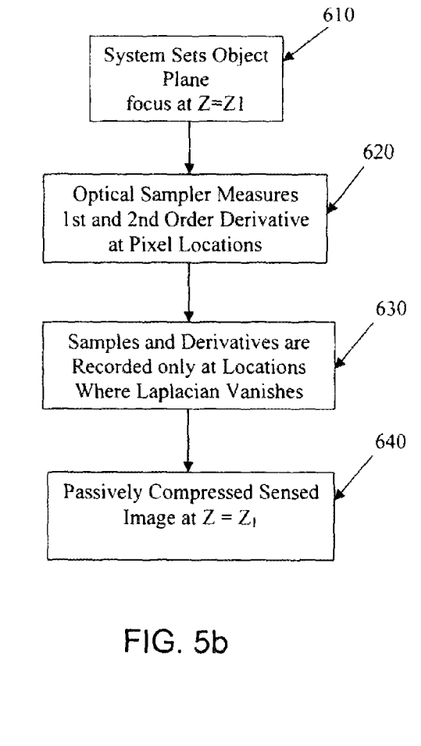
FIG. 5b is a flow chart showing the signal processing chains for the passive sensors.

FIG. 5b is a flow diagram showing the signal processing steps for the passive sensors. The system sets the object plane point beam focus at $Z=Z_1$ in step 610. then in step 620 the optical sampler measures first and second order derivatives at each pixel location. In step 630 the samples and derivatives are recorded only at the locations where Laplacian vanishes to produce a passively compressed sensed image at $Z=Z_1$ in step 640. As shown in the flow charts shown in FIGS. 5a and 5b, both the active (5a) and passive (5b) compressed sensing steps can be repeated for different z-values.

Do note that each DMD micromirror has a fast reset time of approximately 15 microseconds, allowing fast image scan operations. A High Speed (MHz rate) Variable Digital Lens has been demonstrated by co-inventor Riza, et. al and can be used as the ECVFL. The power of the P-MOS can be optimized for the required ECVFL depending on the compressed sensor range. For example, one can use bias lenses to condition the P-MOS range to scan along the optical axis for a distance that matches the target range variation.

Most importantly, the Riza group has also pioneered SLM-based single point detector (or so called single pixel) imagers (e.g., using DMD and liquid crystal SLMs) with early demonstrations for imaging a variety of laser beam irradiances [see S. Sumriddetchkajorn and N. A. Riza, "Micro-Electro-Mechanical System-Based Digitally Controlled Optical Beam Profiler," Applied Optics, Vol. 41, Issue 18, Page 3506, June 2002; N. A. Riza and D. Jorgesen, "Minimally Invasive Optical Beam Profiler," Opt. Express 12, 1892-1901, 2004; N. A. Riza, "Digital optical beam profiler," U.S. Pat. No. 6,922,233, Jul. 26, 2005; N. A. Riza and M. J. Mughal, "Digital optical beam profiler," U.S. Pat. No. 7,092,079, Aug. 15, 2006; M. Gentili and N. A. Riza, "Wide Aperture. No Moving Parts Optical Beam Profiler Using Liquid Crystal Displays," Applied Optics, Vol. 46, pp. 506-512, 2007; M. Sheikh and N. A. Riza, "Demonstration of Pinhole Laser Beam Profiling using a Digital Micromirror Device," IEEE Photon. Tech. Lett, Vol. 21, May 15, 2009].

This original single point photo-detector DMD-based imager described in U.S. Pat. No. 6,922,233 issued Jul. 26, 2005 titled "Digital optical beam profiler" and U.S. Pat. No. 7,092,079 issued Aug. 15, 2006 to N. A. Riza and M. J. Mughal titled "Digital optical beam profiler" are incorporated by reference as novel optical interconnection within the FIG. 1 design as a novel adaptive spatial point optical sampler to implement the passive sensor. The sampler is adaptive much like the active targeting laser beam spot as the sampler pinhole size on the DMD can be controlled by selected the number of $-\theta$ micromirrors. Significantly, the whole DOS imager is adaptive as the passive and active sensor controls are interconnected and can work in unison to provide the best compressed sensing.

The methods and systems of the present invention are also the use of a variable pin-hole size on the DMD for acting as a smart point sampler on the image plane (DMD plane) so final image pixel size of the reconstructed image can be optimized given a certain image type scenario. This pinhole size control feature for the proposed DOS imager gives more intelligence to the implemented compressed sensing function. Note that if the active sensor is turned off (i.e., laser is off), then photo detector 170 can be used as a second port to collect light from the incident, image when lens 130 operates as a collection/focus lens like lens 185.

In other words, both photo detector 170 and photo detector 190 collect light from the incident image such that image total irradiance is given by photo detector 170 and 190 currents at all times during the image scanning process done by the moving pin-hole on the DMD. Thus, one can always normalize the current from photo detector 170 and 190 using the sum of currents from photo detector 170 and 190. In this way, if the total image irradiance varies during the pinhole scanning process such as a cloud passes over a viewed object, the passive in the FIG. 1 imager still delivers a valid final image. Hence, temporal effects on the image being observed by the hybrid differential optical sensing imaging system are negated.

While the invention, has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A hybrid imaging system comprising:
    an active image sensor system using a laser beam to produce a target boundary outline by light flooding to collect an active sparse data set corresponding to the target boundary outline of a target; and
    a passive image sensor system using direct pin-hole spatial optical sampling of an ambient environment light target image to provide a Laplacian for adaptively computing a passive sparse data for dual-mode compressed sensing of the target.

2. The system of claim 1 wherein the active image sensor system comprises:
    a laser source to produce the laser beam for illuminating the target;

a beam controlling optics to transmit the laser beam from the laser source toward the target and to deflect a portion of the optical beam;

an active optical detector to detect the reflected optical beam and convert reflected optical beam to a digital receive data; and an active image control processing unit to receive the digital receive data.

3. The system of claim 2 wherein the beam controlling optics comprises:

a beam steering optics to direct the laser beam; and a digital micromirror device cascaded with a variable beam forming optics, the digital micromirror device deflecting the laser beam to become on-axis with the variable beam forming optics to transmit the on-axis optical beam toward the target and retransmit the reflected optical beam from the target.

4. The system of claim 3 wherein the beam steering optics comprises:

an active beam splitter cascaded with a collimating lens for transmitting the laser beam from the laser source to the digital micromirror device.

5. The system of claim 4 wherein the variable beam forming optics comprises:

an optical lens cascaded with an electronically controlled variable focus lens as a variable three-dimensional beam forming optic to controllably change a beam spot size on the target as a target distance sensor; and a scanning mirror having an x-y motion controllable by the active image control processing unit to reflect the on-axis optical beam toward the target for scanning the target with the on-axis optical beam in at least one of an x and y direction to spatially sample the target in a transverse dimension to determine target profile boundaries in x and y coordinates.

6. The system of claim 3 wherein the optical detector comprises:

a receive beam steering optics to receive the reflected optical beam from the target to form an object image on a camera that converts the object image to a moderate resolution digital data for the active image control processing unit.

7. The system of claim 6 wherein the optical detector further comprises:

an active photodetector to detect the deflected optical beam from the receive beam steering optics and convert the detected optical beam to the digital receive data for the active image control processing unit.

8. The system of claim 5 wherein the passive image sensing system comprises:

a passive collection lens to receive an ambient light from the target environment when the laser source is in an off position;

a passive photo detector to detect the ambient light beam passing through the passive collection lens and producing a current as a measurement of an optical irradiance of a target pixel location;

a passive image control processing unit to control the variable beam forming optics that transmits ambient light from the target environment for each next pixel location and collect the passive sparse data set.

9. A hybrid differential optical sensing method comprising the steps of:

scanning a target with a spatially variable laser sampling beam spot to produce a target boundary outline;

adaptively sensing a reflected laser light reflected from the target to form an object image of the target boundary outline;

acquiring a sparse active data set from the target boundary outline;

using a direct controlled pin-hole optical sampling to acquire a Laplacian from an ambient target environment light;

adaptively computing a sparse passive data set from the Lapacian; and producing a compressed sensed image from the sparse active and passive data sets.

10. The method of claim 9 wherein the scanning step comprises the steps of:

providing a laser beam from a laser source;

using a variable beam forming optics to condition the laser beam on the target;

varying a spot size of the laser beam as the spatially variable laser sampling beam spot;

using light flooding to produce the target boundary outline with the laser beam; and controlling an angular position of a scanning mirror to produce x-y motion on a transverse target field to spatially sample the target in a transverse dimension.

11. The method of claim 10 further comprising the step of:

repeating the varying and controlling steps to determine target profile and height boundary changes.

12. The method of claim 11, wherein the repeating step comprises the steps of:

scanning the target in an x direction while varying the spot size of the laser beam; and scanning the target in a y-direction while varying the spot size to determine asymmetrical target height features.

13. The method of claim 10 wherein the sensing step comprises the steps of:

actively sensing the target boundary outline from the reflected laser light; and passively sensing the ambient light from the target environment.

14. The method of claim 13 wherein the active sensing step comprises the step of:

focusing the reflected laser light on an image recording device and an active photodetector;

forming a target image on the image recording device; and detecting the reflected laser light by the active photodetector and producing an output signal in response to detecting the reflected laser light.

15. The method of claim 14 further comprising the step of:

producing a received time modulation by the photodetector output signal from the illuminated target; and using laser radar processing for target distance measurements.

16. The method of claim 13 wherein the passive sensing step comprises the steps of:

using a digital micromirror device as a moving pinhole two-dimension image direct optical sampler;

focusing the ambient light from the target environment on a passive photodetector;

measuring a current from the passive photodetector to determine an optical irradiance of a targeted location in an incident object image;

shifting a pinhole location on the digital micromirror device by a pixel along each of a x-direction and a y-direction;

comparing each next optical irradiance to compute an inter pixel irradiance differential current and the Laplacian; and repeating the focusing, measuring, shifting and comparing steps for each pixel location in an image on a digital micromirror plane.

17. The method of claim 16 wherein the comparing step further comprises the step of:

recording the optical irradiance value and pixel location when the current is greater than a predetermined threshold value; and discarding the optical irradiance value when the optical irradiance is less than the predetermined threshold value.

18. The method of claim 16 further comprising the steps of:

repeating the focusing, measuring, shifting and comparing steps for a 2-pixel inter-pixel distance along the x direction and the y direction to provide a first order approximation of the Laplacian.

19. A hybrid differential optical sensing method comprising the steps of:

setting a object plane point beam focus at a selected point;

setting a mirror x-tilt by $\Delta\theta_x$ to point a laser beam at $\Delta X$ object plane position;

varying a laser beam spot size to an object plane boundary observed by an object reflected light at a recording device;

recording an optical power, a beam spot location and laser beam spot size; and repeating for each of a X and a Y object plane to adaptively output a sparse image.

* * * * *